United States Patent [19]
Sunada et al.

[11] Patent Number: 5,681,240
[45] Date of Patent: Oct. 28, 1997

[54] GEARSHIFT CONTROLLING SYSTEM FOR VEHICLE AUTOMATIC TRANSMISSION

[75] Inventors: Satoru Sunada; Shoichi Tanizawa, both of Wako, Japan

[73] Assignee: Honda Giken Kogyo Kabushiki Kaisha, Tokyo, Japan

[21] Appl. No.: 610,137

[22] Filed: Feb. 29, 1996

[30] Foreign Application Priority Data

Mar. 2, 1995  [JP]  Japan ................................. 7-068755

[51] Int. Cl.$^6$ ............................ F16H 59/04; F16H 59/24
[52] U.S. Cl. ................................... 477/125; 477/906
[58] Field of Search ............................. 477/125, 906

[56] References Cited

U.S. PATENT DOCUMENTS

| | | | |
|---|---|---|---|
| 4,823,644 | 4/1989 | Ohkumo | 477/906 |
| 4,922,425 | 5/1990 | Mack et al. | 477/906 |
| 4,975,844 | 12/1990 | Holbrook et al. | 477/906 |
| 5,056,022 | 10/1991 | Witkowski et al. | 477/906 |
| 5,117,711 | 6/1992 | Iizuka | 477/906 |
| 5,366,424 | 11/1994 | Wataya | 477/906 |

FOREIGN PATENT DOCUMENTS 63-47546  2/1988  Japan.

*Primary Examiner*—Dirk Wright
*Attorney, Agent, or Firm*—Armstrong, Westerman, Hattori, McLeland & Naughton

[57] ABSTRACT

A gearshift controlling system for controlling a vehicle automatic transmission. In the system, a first alternative throttle opening degree is predetermined in case of failure of a throttle position sensor, and a second alternative throttle opening is similarly determined such that a gear ratio can be determined based on the detected vehicle speed and the second alternative engine load in a gear ratio decreasing or increasing direction. Either of the first alternative throttle opening degree or the second alternative throttle opening is selected and the gear ratio to be shifted to is determined in accordance with the predetermined gearshift schedule based on the detected vehicle speed and the selected alternative engine load, to output the gearshift command, thereby preventing unexpected gearshift to occur.

10 Claims, 4 Drawing Sheets

GEARSHIFT CONTROLLING SYSTEM FOR VEHICLE AUTOMATIC TRANSMISSION

BACKGROUND OF THE INVENTION

1. Field of the Invention

This invention relates to a gearshift controlling system for a vehicle automatic transmission, and more particularly to such a system which relates to a determination of a throttle position sensor value in gearshift control when the throttle position sensor fails.

2. Description of the Related Art

In prior art vehicle automatic transmissions, predetermined gearshift characteristics based on engine load (degree of throttle opening) are stored in an on-board microcomputer memory and during actual driving the gear ratio to be established is determined based on the gearshift schedule using detected values of the vehicle speed and the engine load as memory address data.

If during driving in a high-speed gear, e.g., in fourth gear, a vehicle equipped with an automatic transmission of this type experiences failure of the sensor for detecting the engine load (the degree of throttle opening), so that, as shown by A in FIG. 3, the detected throttle opening value B becomes higher than the actual value A, a sudden downshift is apt to occur when the transmission continues to operate according to the gearshift schedule shown in the same figure. Because of this, Japanese Laid-Open Patent Application No. Sho 63(1988)-47546 proposes establishing an alternate value for use in place of the sensor value when the throttle position sensor fails.

Since the alternative value is a fixed value in terms of degree of throttle opening, such 0% or 50%, the system replaces a fully-opened or wide-open throttle (WOT) with a throttle opening of 0% or 50% and replaces a fully closed throttle with a throttle opening of 50% or a wide-open throttle. While this may not cause a driving problem, it invariably produces a gearshift which feels strange to the driver because of its unexpected nature. When the throttle opening is replaced with a smaller opening such as an alternative value of 0% during low speed driving, moreover, the resulting gearshift in the direction of increasing the gear ratio degrades acceleration performance and lowers fuel economy.

SUMMARY OF THE INVENTION

An object of this invention is therefore to overcome the aforesaid problems of the prior art by providing a gear shift controlling system for vehicle automatic transmission which responds to failure of a sensor for detecting the degree of throttle opening or some other parameter indicative of engine load by replacing the engine load value with an alternative value determined from the gear ratio and vehicle speed at that time based on the gearshift scheduling characteristics, thereby avoiding an unexpected gearshift.

This invention achieves this object by providing a gearshift controlling system for a vehicle automatic transmission, comprising a vehicle speed detecting means for detecting a vehicle speed, an engine load detecting means for detecting an engine load, and gearshift command output means for determining a gear ratio to be shifted to in accordance with a predetermined gearshift schedule based on the detected vehicle speed and the engine load, to output a gearshift command. In the system, alternative engine load determining means is provided for determining an alternative engine load in case of failure of said engine load detecting means such that said gearshift command output means determines a same gear ratio as is currently selected based on the detected vehicle speed and the alternative engine load and said gearshift command output means determines the gear ratio to be shifted to in accordance with the predetermined gearshift schedule based on the detected vehicle speed and the alternative engine load, to output the gearshift command.

BRIEF EXPLANATION OF THE DRAWINGS

The foregoing and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
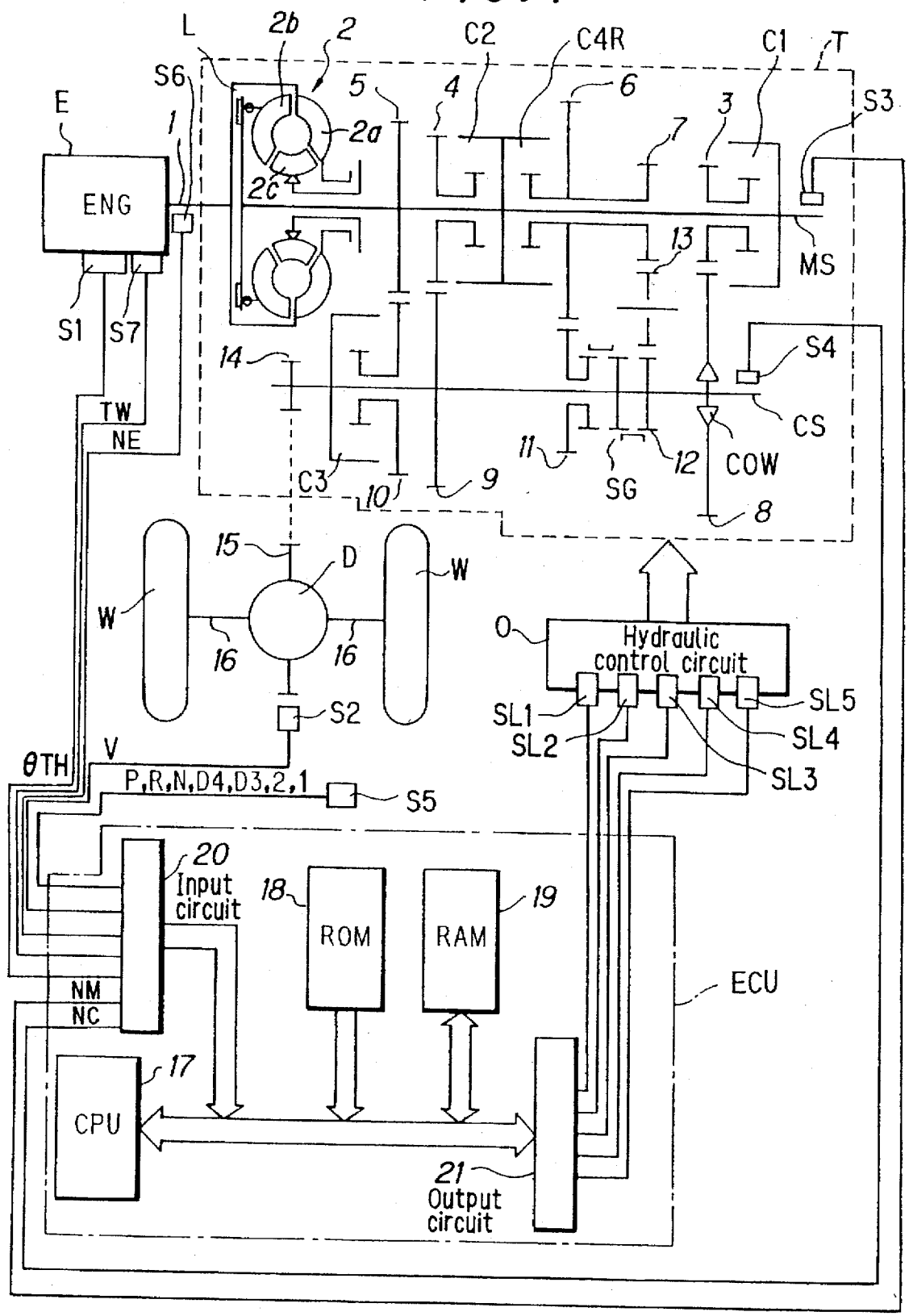
FIG. 1 is an overall view of a gearshift controlling system for a vehicle automatic transmission.

FIG. 1 is an overall view of the gearshift controlling system for a vehicle automatic transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear (gear ratio or gear stage) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle Valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the counter-shaft CS.

A shift lever position sensor S5 is provided in the vicinity of a shift lever (not shown) installed on the vehicle floor near the driver's seat that allows the driver to select one of seven positions P, R, N, D4, D3, 2 and 1 each corresponding to the gear ranges mentioned above in the well-known manner. The shift lever position sensor S5 detects which of the seven positions has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (gear ratio) and energizes/deenergizes shift solenoids SL1, SL2 of a hydraulic control circuit O via the output circuit 21 so as to switch shift valves (not shown) and thereby engage/disengage the hydraulic clutches of prescribed gears, and controls the operation of the lockup clutch L of the torque converter 2 via control solenoids SL3 and SL4. The CPU 17 also controls the clutch hydraulic pressure by controlling a linear solenoid SL5.

The operation of the system will now be explained with reference to the flowchart of FIG. 2.

Figure 2:
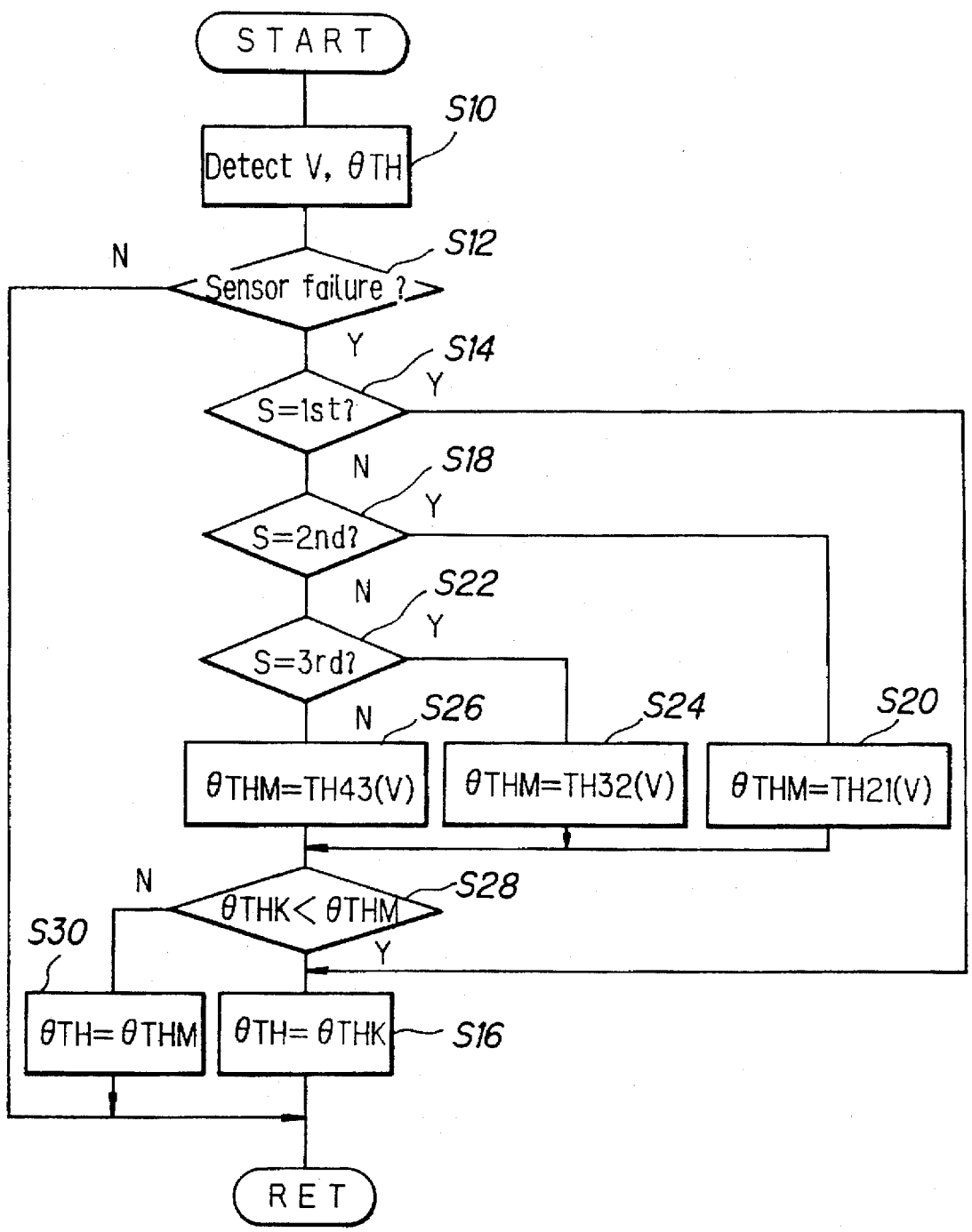
FIG. 2 is a flowchart showing the operation of the system illustrated in FIG. 1.

By way of example, FIG. 2 focuses on determining a throttle opening value for preventing a gearshift in the direction of reduced gear ratio, i.e., a downshift, when sensor failure occurs while driving at a relatively small throttle opening of, say, not more than ⅝ (Here: WOT=⅝). This routine is activated at regular time intervals.

First, in S10, the vehicle speed V and the throttle opening θTH are detected, whereafter the program goes to S12, in which it is checked whether the throttle position sensor S1 has failed. This check can be made, for example, by checking whether a wide-open or fully closed signal is produced continuously over a prescribed time period. In this specification, failure of the throttle position sensor S1 is defined as including not only failure of the sensor itself but also failures resulting from open and shorted signal lines and the like.

Figure 3:
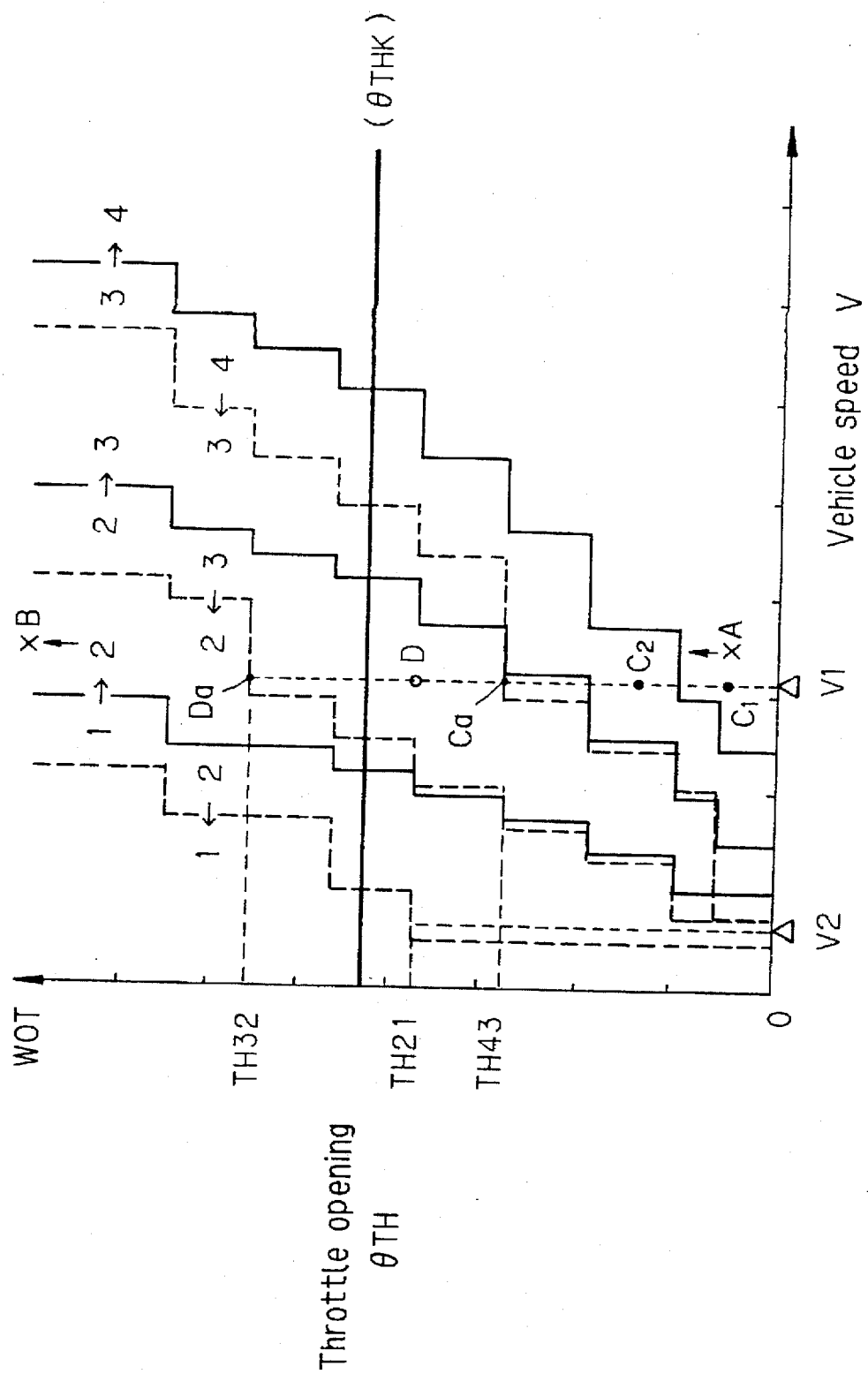
FIG. 3 is a graph showing a gearshift scheduling characteristic (map) referred to in the flowchart of FIG. 2.

When S12 finds that the throttle position sensor S1 has not failed, the routine is immediately terminated, and when it finds that the throttle position sensor S1 has failed, the program goes to S14, in which it is checked whether the current gear (gear ratio) S is first gear. When the result in S14 is YES, the program goes to S16, in which the throttle opening (degree) θTH (value from the failed sensor) is replaced by a reference alternative value θTHK (fixed value; the aforesaid first alternative value) set beforehand for dealing with sensor failure, whereafter the routine is terminated. As a result, the CPU 17 conducts gearshift control by using the reference alternative value and the detected vehicle speed to look up the shift map shown in FIG. 3.

When S14 finds that the gear S is not first gear, the program goes to S18, in which it is checked whether the current gear is second gear. When the result in S18 is YES, the program goes to S20, in which a given throttle opening TH21(V) is defined as a second alternative value θTHM. On the other hand, when S18 finds that the current gear is not second gear, the program goes to S22, in which it is checked whether the current gear is third gear. When the result in S22 is YES, the program goes to S24, in which a given throttle opening TH32(V) is defined as the second alternative value θTHM, and when S22 finds that the current gear is not third gear, i.e., that the current gear is fourth gear, the program goes to S26, in which a given throttle opening TH43(V) is defined as the second alternative value θTHM.

The program then goes to S28, in which the calculated second alternative value θTHM is compared with the aforesaid reference alternative value θTHK. When S28 finds that the calculated second alternative value θTHM is larger than the reference alternative value θTHK, namely, that it represents a larger throttle opening, the program goes to S16, in which the throttle opening θTH (value from the failed sensor) is replaced by the reference alternative value θTHK. When S28 finds that the second alternative value θTHM is equal to or smaller than the reference alternative value θTHK, the program goes to S30, in which the throttle opening θTH (value from the failed sensor) is replaced by the second alternative value θTHM.

The foregoing will now be explained again referring to FIG. 3. For coping with possible sensor failure, the reference alternative value θTHK is preestablished to a fixed value in the vicinity of a ⅛ opening.

Assume that sensor failure occurs at a throttle opening C1 (fourth-gear region) or C2 (third-gear region) during driving at a vehicle speed of V1. If the reference alternative value θTHK should be used at this time, then, in the case of throttle opening C1 (fourth-gear region), the vehicle operating condition will cross the 4→3 downshift line and, as a result, a gearshift command will be output and a downshift will occur.

This downshift can be avoided by selecting as the second alternative value θTHM (=TH43(V1)) the value Ca on the 4→3 downshift line corresponding to the vehicle speed V1 at the time sensor failure was detected, comparing it with the reference alternative value θTHK, and when θTHK is larger, using the second alternative value θTHM as the throttle opening value during sensor failure, and when it is not larger, using the reference alternative value θTHK as the throttle opening value during sensor failure.

The reason why θTHM is compared with θTHK is that, during driving at, for example, point D (second or third gear region), the value to be compared with the reference alternative value θTHK will be the value Da on the 3→2 downshift line defining the second alternative value θTHM at the vehicle speed V1, namely, TH32(V1). Since the throttle opening TH32(V1) is on the downshift line, its use at this time may cause a downshift immediately thereafter. This can be avoided by using the reference alternative value θTHK. In the invention, therefore, the second alternative value θTHM is compared with the reference alternative value θTHK and a value on the small opening side is finally selected.

From the above, the second alternative value θTHM is defined as the throttle opening at the position where the vehicle speed V at the time of sensor failure detection intersects with the downshift line of the gear at that time. Therefore, if sensor failure should be detected during driving in second gear at vehicle speed V2, for example, the second alternative value θTHM will be as shown in the drawing. Thus, the second alternative value θTHM is not a fixed value but one determined in light of the vehicle speed and the gear at the time of sensor failure detection.

As just explained, since determining the throttle opening value on the downshift line involves the risk of a downshift immediately thereafter, it is preferable to determine it to be a somewhat smaller opening than the value of the downshift line.

Being configured in the foregoing manner, this embodiment is able to prevent the occurrence of a gearshift in the direction of lower gear ratio (a down shift), which would not ordinarily be expected by the driver, even when the throttle position sensor for detecting engine load fails. As a result, the driver is saved from experiencing an unnatural feeling when such a failure occurs.

Figure 4:
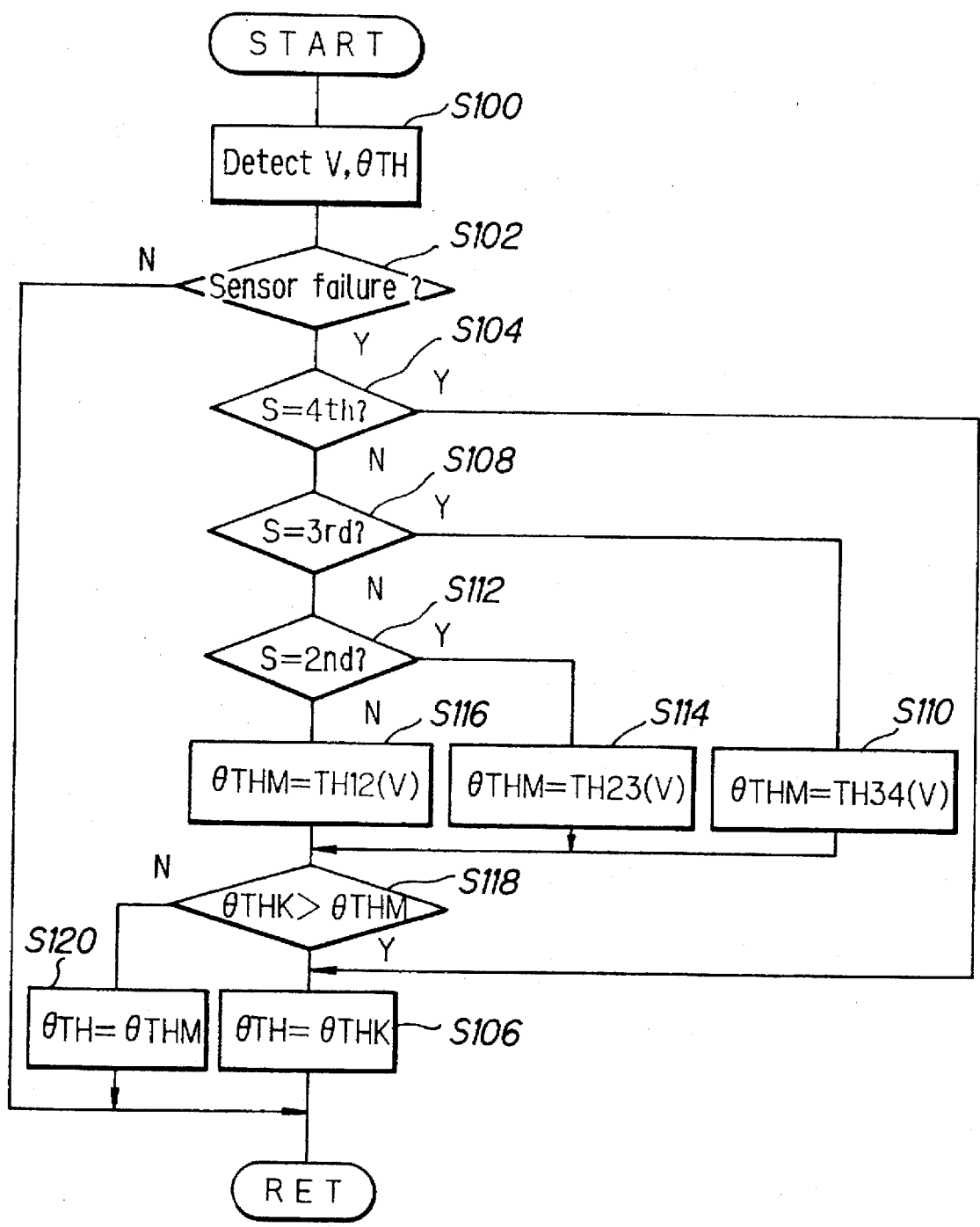
FIG. 4 is a view, similar to FIG. 2, but showing the operation of the system according to a second embodiment of the invention.

FIG. 4 is a flowchart, similar to that in FIG. 2, showing a second embodiment of the invention. The second embodiment aims to prevent occurrence of an upshift which might otherwise occur upon detection of sensor failure during driving at a large throttle opening of ⅝ or greater owing to the alternative value being determined to be much smaller than throttle opening.

The program passes through S100 and S102 to S104, in which it is checked whether the current gear is fourth gear. When it is, no upshift is possible and the program goes to S106, in which the throttle opening θTH (value from the failed sensor) is replaced by the reference alternative value θTHK.

When the result in S104 is NO, the program goes to S108, in which it is checked whether the current gear is third gear. When the result in S108 is YES, the program goes to S110, in which TH34(V) is used as the second alternative value θTHM (the aforesaid second alternative value). TH34(V) is decided from the vehicle speed at the time of sensor failure detection and the upshift line (3→4) of the third gear, which is the gear at that time. When the result in S108 is NO, the program goes through. S112 and S116, in which similar processing is conducted, to S118, in which the reference alternative value and the second alternative value are compared. When S118 finds the reference alternative value to be larger than the second alternative value, the reference alternative value is used as the second alternative value throttle opening. In the opposite case, the second alternative value is used as the throttle opening. In other words, upshift is prevented by selecting a value on the large opening side.

On the other hand, when S112 determines that the current gear is second gear, the program goes to S114 where TH23(V) is used as the second alternative value θTHM.

Being configured in the foregoing manner, the second embodiment is able to prevent the occurrence of a gearshift in the direction of higher gear ratio (an upshift) even when the throttle position sensor for detecting engine load fails and, as such, avoids degradation of acceleration performance and lowering of fuel economy.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. An improved gearshift controlling system for a vehicle automatic transmission, comprising:

a vehicle speed detecting means for detecting a vehicle speed;

an engine load detecting means for detecting an engine load; and gearshift command output means for determining a gear ratio to be shifted to in accordance with a predetermined gearshift schedule based on the detected vehicle speed and the engine load, to output a gearshift command, the improvement comprising:

gear ratio detecting means for detecting a current gear ratio;

alternative engine load determining means for determining an alternative engine load in case of failure of said engine load detecting means in response to at least the detected current gear ratio such that said gearshift command output means determines a same gear ratio as is currently selected based on the detected vehicle speed and the alternative engine load; and said gearshift command output means determines the gear ratio to be shifted to in accordance with the predetermined gearshift schedule based on the detected vehicle speed and the alternative engine load, to output the gearshift command.

2. An improved gearshift controlling system according to claim 1, wherein said engine load detecting means detects the engine load through a throttle opening degree of the engine.

3. An improved gearshift controlling system for a vehicle automatic transmission, comprising:

a vehicle speed detecting means for detecting a vehicle speed;

an engine load detecting means for detecting an engine load; and gearshift command output means for determining a gear ratio to be shifted to in accordance with a predetermined gearshift schedule based on the detected vehicle speed and the engine load, to output a gearshift command, the improvement comprising:

first alternative determining means for determining a first alternative engine load in case of failure of said engine load detecting means;

second alternative determining means for determining a second alternative engine load, which is equal to or less than a predetermined value, in a direction other than that in which the gear ratio is decreased in case of failure of said engine load detecting means;

comparing means for comparing the first alternative engine load with the second alternative engine load to select a smaller of the first alternative engine load and the second alternative engine load; and said gearshift command output means determines the gear ratio to be shifted to in accordance with the predetermined gearshift schedule based on the detected vehicle speed and the selected alternative engine load, to output the gearshift command.

4. An improved gearshift controlling system according to claim 3, wherein said second alternative determining means determines the second alternative engine load to a value as large as possible to an extent that said gearshift command output means determines a gear ratio in a direction other than that in which the gear ratio is decreased.

5. An improved gearshift controlling system according to claim 3, wherein the second alternative engine load is a variable value determined with respect to the vehicle speed and the gear ratio.

6. An improved gearshift controlling system according to claim 3, wherein said engine load detecting means detects the engine load through a throttle opening degree of the engine.

7. An improved gearshift controlling system for a vehicle automatic transmission, comprising;

a vehicle speed detecting means for detecting a vehicle speed;

an engine load detecting means for detecting an engine load; and gearshift command output means for determining a gear ratio to be shifted to in accordance with a predetermined gearshift scheduled based on the detected vehicle speed and the engine load, to output a gearshift command, the improved comprising:

first alternative determining means for determining a first alternative engine load in case of failure of said engine load means;

second alternative determining means for determining a second alternative engine load, which is equal to or greater than a predetermined value, in a direction other than that in which the gear ratio is increased in case of failure of said engine load detecting means;

comparing means for comparing the first alternative engine load with the second alternative engine load to select a larger of the first alternative engine load and the second alternative engine load; and said gearshift command output means determines the gear ratio to be shifted to in accordance with the predetermined gearshift schedule based on the detected vehicle speed and the selected alternative engine load to output the gearshift command.

8. An improved gearshift controlling system according to claim 7, wherein said second alternative determining means determines the second alternative engine load to a value as small as possible to an extent that said gearshift command output means determines a gear ratio in a direction other than that in which the gear ratio is increased.

9. An improved gearshift controlling system according to claim 7, wherein the second alternative engine load is a variable value determined with respect to the vehicle speed and the gear ratio.

10. An improved gearshift controlling system according to claim 7, wherein said engine load detecting means detects the engine load through a throttle opening degree of the engine.

* * * * *